(12) United States Patent
Brooks et al.

(10) Patent No.: US 6,963,484 B2
(45) Date of Patent: Nov. 8, 2005

(54) AIRFLOW BLOCKER COMPONENT THAT COMPRISES A FLEXIBLE FLAP PORTION

(75) Inventors: Michael Alan Brooks, Antelope, CA (US); Jeremy Wilson, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 18 days.

(21) Appl. No.: 10/738,106

(22) Filed: Dec. 17, 2003

(65) Prior Publication Data

US 2005/0136825 A1    Jun. 23, 2005

(51) Int. Cl.[7] .............................................. H05K 7/20
(52) U.S. Cl. ...................... 361/678; 361/691; 361/695
(58) Field of Search ............................. 361/678, 690, 361/691, 694, 695; 454/184

(56) References Cited

U.S. PATENT DOCUMENTS

| | | | |
|---|---|---|---|
| 3,967,874 A * | 7/1976 | Calabro ....................... 361/695 |
| 4,106,076 A * | 8/1978 | Miller et al. ................. 361/694 |
| 4,736,274 A * | 4/1988 | Davies et al. ................ 361/756 |
| 4,851,965 A | 7/1989 | Gabuzda et al. |
| 5,006,959 A | 4/1991 | Freige et al. |
| 5,210,680 A | 5/1993 | Scheibler |
| 5,260,850 A | 11/1993 | Sherwood et al. |
| 5,398,159 A * | 3/1995 | Andersson et al. .......... 361/695 |
| 5,492,505 A * | 2/1996 | Bell et al. .................... 454/162 |
| 5,615,085 A | 3/1997 | Wakabayashi et al. |
| 5,694,294 A * | 12/1997 | Ohashi et al. ............... 361/687 |
| 5,734,552 A * | 3/1998 | Krein ........................... 361/695 |
| 5,828,549 A | 10/1998 | Gandre et al. |
| 5,842,503 A * | 12/1998 | Foley ....................... 137/512.4 |
| 5,914,857 A * | 6/1999 | Johnson et al. .............. 361/690 |
| 5,969,942 A * | 10/1999 | Heckner et al. ............. 361/695 |
| 6,026,895 A | 2/2000 | Moresco et al. |
| 6,058,011 A | 5/2000 | Hardt et al. |
| 6,088,223 A | 7/2000 | Diemunsch |
| 6,152,214 A | 11/2000 | Wagner |
| 6,272,007 B1 | 8/2001 | Kitlas et al. |
| 6,280,317 B1 | 8/2001 | Przilas et al. |
| 6,359,779 B1 | 3/2002 | Frank, Jr. et al. |
| 6,364,009 B1 | 4/2002 | MacManus et al. |
| 6,400,568 B1 | 6/2002 | Kim et al. |
| 6,477,044 B2 | 11/2002 | Foley et al. |
| 6,862,182 B1 * | 3/2005 | Roman et al. ............... 361/697 |
| 2003/0011989 A1 * | 1/2003 | Chan ............................ 361/695 |
| 2004/0184234 A1 * | 9/2004 | Kosugi ........................ 361/695 |

* cited by examiner

Primary Examiner—Harold Joyce

(57) ABSTRACT

An airflow blocker component of an apparatus in one example is coupled with a support component. The airflow blocker component comprises a flexible flap portion that is bendable away from the support component into a position that directs one or more airflow portions to promote an increased cooling of one or more thermal components.

29 Claims, 2 Drawing Sheets

AIRFLOW BLOCKER COMPONENT THAT COMPRISES A FLEXIBLE FLAP PORTION

BACKGROUND

Thermally sensitive environments may employ forced-air cooling systems to cool interior thermal components. The thermally sensitive environment in one example comprises a computer system with one or more thermal components. The thermal components in one example require cooling during operation. The thermal components may comprise heat producing components, heat sinks, electronic components, and the like. For example, the computer system may have one or more central processing units that require forced-air cooling.

In forced-air cooling computer systems that have open spaces adjacent to the thermal components, airflow portions may avoid passing through or against the thermal components by passing through the open spaces. The open spaces may be locations for optional computer components. For example, some computer systems are designed to handle multiple central processing units. However, the computer systems may operate with a single central processing unit which leaves open spaces within the computer chassis where additional central processing units may operate. The open spaces that allow passage of the portions of airflow hinder the cooling of the adjacent thermal components.

Airflow blocker components may be employed to impede airflow from passing through the open spaces. The airflow blocker components fill the open spaces to direct the airflow away from the open spaces and towards the thermal components to promote increased cooling of the thermal components. In one example, the airflow blocker is sized similarly to the missing optional component that fits within the open space. The airflow blocker in one example is screwed or snapped into place in the open space. Once a user decides to add the optional component (e.g., a second central processing unit) into the open space, then the user removes the airflow blocker from the computer chassis freeing up the open space for the optional component.

SUMMARY

The invention in one embodiment encompasses an apparatus. The apparatus comprises an airflow blocker component coupled with a support component. The airflow blocker component comprises a flexible flap portion that is bendable away from the support component into a position that directs one or more airflow portions to promote an increased cooling of one or more thermal components.

Another embodiment of the invention encompasses an apparatus. The apparatus comprises a flexible flap that is bendable away from a support component into a position that serves to impede one or more airflow portions from passing through a space in a chassis. One or more first holder components that serve to maintain the flexible flap in the position to impede the one or more airflow portions when the space is open. One or more second holder components that serve to maintain the flexible flap against the support component when an additional component fills the space.

Yet another embodiment of the invention encompasses a method. An airflow blocker component that comprises a flexible flap portion is coupled to a support component within a chassis. The flexible flap portion is bent away from the support component into a position that directs one or more airflow portions to promote an increased cooling of one or more thermal components.

DESCRIPTION OF THE DRAWINGS

Features of exemplary implementations of the invention will become apparent from the description, the claims, and the accompanying drawings in which:

DETAILED DESCRIPTION

Referring to the BACKGROUND section above, the airflow blocker components used in the computer systems in one example are designed to be removable from the computer system when the open space is filled with the optional component. As one shortcoming, the airflow blocker components may be lost during the time that they are outside the computer system. Thus, if the optional component is removed from the computer system and misplaced, then a new airflow blocker component may be required to fill the open space.

Figure 1:
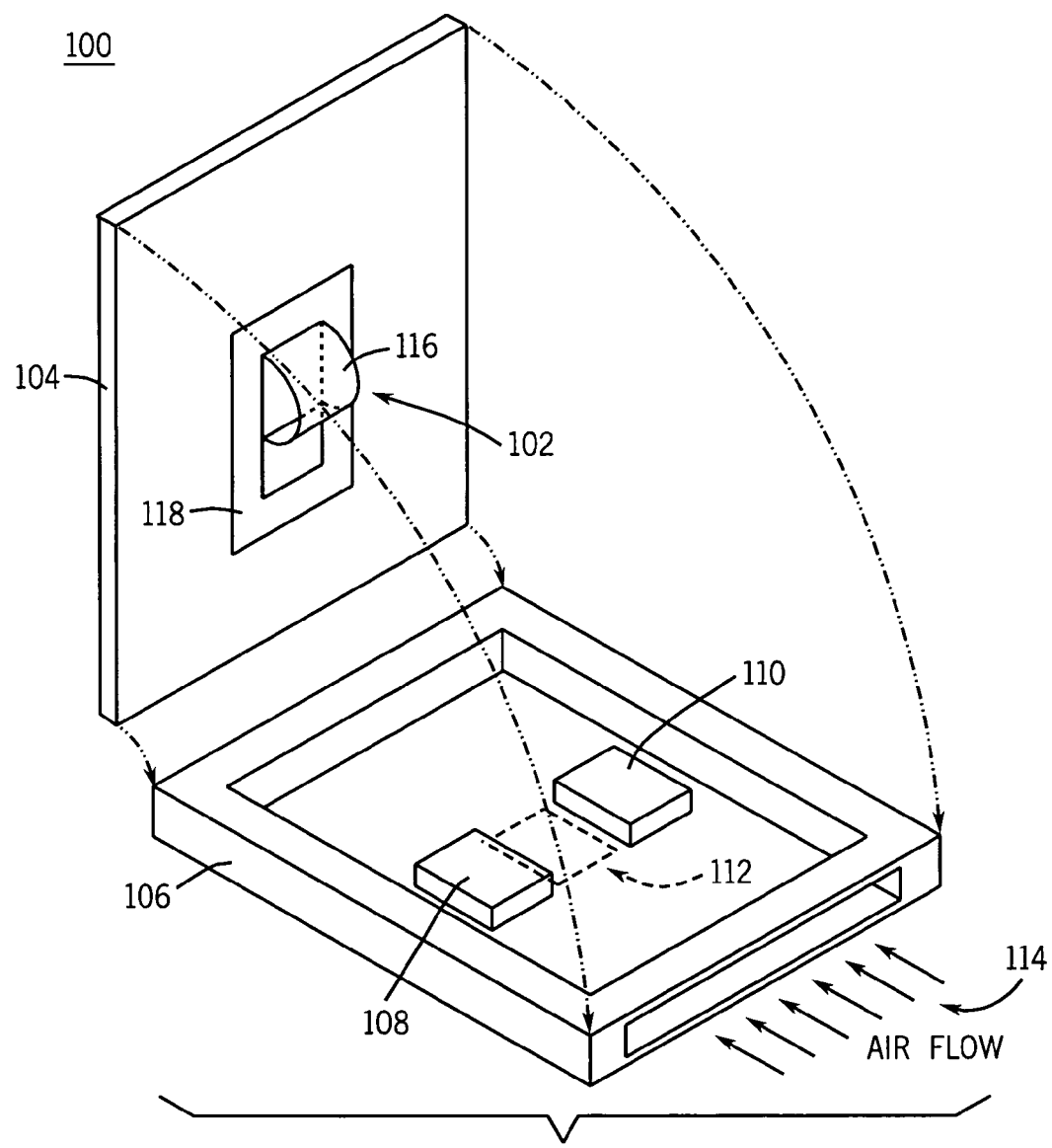
FIG. 1 is a representation of an exemplary implementation of an apparatus that comprises one or more airflow blocker components, one or more support components, a chassis, and one or more thermal components.

Turning to FIG. 1, an apparatus 100 in one example comprises one or more airflow blocker components 102, one or more support components 104, a chassis 106, and one or more thermal components 108 and 110. One or more open spaces 112 in one example are adjacent to one or more of the thermal components 108 and 110. An airflow 114 passes through the chassis 106 for forced-air cooling of the thermal components 108 and 110.

The airflow blocker component 102 in one example comprises a flexible flap portion 116 and an attachment portion 118. The airflow blocker component 102 in one example comprises a layer of flexible material. For example, the airflow blocker component 102 comprises a thin layer of plastic, sheet metal, paper, or the like. In one example, both the flexible flap portion 116 and the attachment portion 118 are flexible. For example, the flexible flap portion 116 and the attachment portion 118 are integral portions of the layer of flexible material. In another example, the flexible flap portion 116 is flexible and the attachment portion 118 is inflexible. For example, the flexible flap portion 116 is formed from the layer of flexible material and connected with the attachment portion 118.

The airflow blocker component 102 is coupled with the support component 104. For example, the airflow blocker component 102 is positioned on the support component 104 so that the flexible flap portion 116 is aligned with the open space 112 within the chassis 106. In one example, an adhesive connects the attachment portion 118 with the support component 104. In another example, screws, clamps, clips, pins, or nails connect the attachment portion 118 with the support component 104. The connection between the attachment portion 118 and the support component 104 allows freedom of the flexible flap portion 116 to bend away from the support component 104.

The flexible flap portion 116 is bendable away from the support component 104 into a position that directs one or more portions of the airflow 114 to promote an increased cooling of the thermal components 108 and 110. For example, the flexible flap portion 116 is bendable into a bent position to fill a portion of the open space 112. When the flexible flap portion 116 fills the portion of the open space 112, the flexible flap portion 116 directs the portions of the airflow 114 away from the open space 112 and towards the thermal components 108 and 110. For example, the flexible flap portion 116 impedes the airflow 114 from flowing through the open space 112. If a smaller portion of the airflow 114 passes through the open space 112, then a larger portion of the airflow 114 is likely to pass through or against the thermal components 108 and 110. An increase in the amount of the airflow 114 that passes through or against the thermal components 108 and 110 promotes the increased cooling of the thermal components 108 and 110.

The flexible flap portion 116 may be in any one of a plurality of operational positions within the chassis 106. In one example, the flexible flap portion 116 may be in the bent position to block a portion of the open space 112. In another example, the flexible flap portion 116 may be in a substantially flat position against the support component 104 to allow an additional component to fill a portion of the open space 112. For example, the flexible flap portion 116 is adjustable between blocking substantially none of the open space 112, blocking any subportion of the open space 112, and blocking substantially all of the open space 112. The flexible flap portion 116 may comprise one or more perforations or other alterations to increase or decrease an amount of the airflow 114 that the flexible flap portion 116 allows to pass through the open space 112.

In one example, one or more holder components maintain the flexible flap portion 116 in the bent position. In another example, one or more holder components maintain the flexible flap portion 116 against the support component 104 to allow an additional component to fill the open space 112. The flexible flap portion 116 may employ a reusable adhesive that allows the flexible flap portion 116 to attach, detach from, and reattach with the support component 104. For example, the reusable adhesive holds the flexible flap portion 116 in the substantially flat position against the support component 104. Alternatively, the airflow blocker component 102 or support component 104 may comprise a cut feature, a bent feature, or a flexible webbing that could hold the flexible flap portion 116 in the flat position.

In one example, the support component 104 comprises a chassis lid. For example, the airflow blocker component 102 is coupled with the chassis lid at a location that is aligned with the open space 112. Upon closure of the chassis lid with the chassis 106, the flexible flap portion 116 is bendable into the open space 112 to impede passage of the airflow 114 through the open space 112. In another example, the support component 104 comprises a wall of the chassis 106. In yet another example, the support component 104 is within the chassis 106, such as a printed circuit board, central processing unit, and the like. The airflow blocker component 102 may be connected with any surface in proximity to the open space 112. Also, the airflow blocker component 102 may be connected with other areas within the chassis 106 that would benefit from a blockage or redirection of portions of the airflow 114.

The chassis 106 in one example comprises a computer chassis that houses the thermal components 108 and 110 for a computer system. The computer chassis may also house one or more of the airflow blocker components 102. For example, the computer chassis may have one or more of the open spaces 112 that would benefit from an associated one of the airflow blocker components 102. The thermal components 108 and 110 may comprise heat producing components, heat sinks, electronic components, computer components, and the like. For example, the thermal components 108 and 110 require forced-air cooling during operation of the computer system. The thermal components 108 and 110 in one example are adjacent to the open space 112. Thus, to increase the cooling of the thermal components 108 and 110 the flexible flap portion 116 is bent into the open space 112 to direct portions of the airflow 114 away from the open space 112 and towards the thermal components 108 and 110.

The open space 112 in one example comprises an area for connection of an additional component with the computer system within the chassis 106. For example, the open space 112 may allow connection of an additional central processing unit into the computer system. The open space 112 has a low airflow resistance which allows easy passage for portions of the airflow 114 through the open space 112. Until the additional central processing unit is added into the computer system, the open space 112 may be filled with the flexible flap portion 116 to prevent portions of the airflow 114 from passing through the open space 112.

Figure 2:
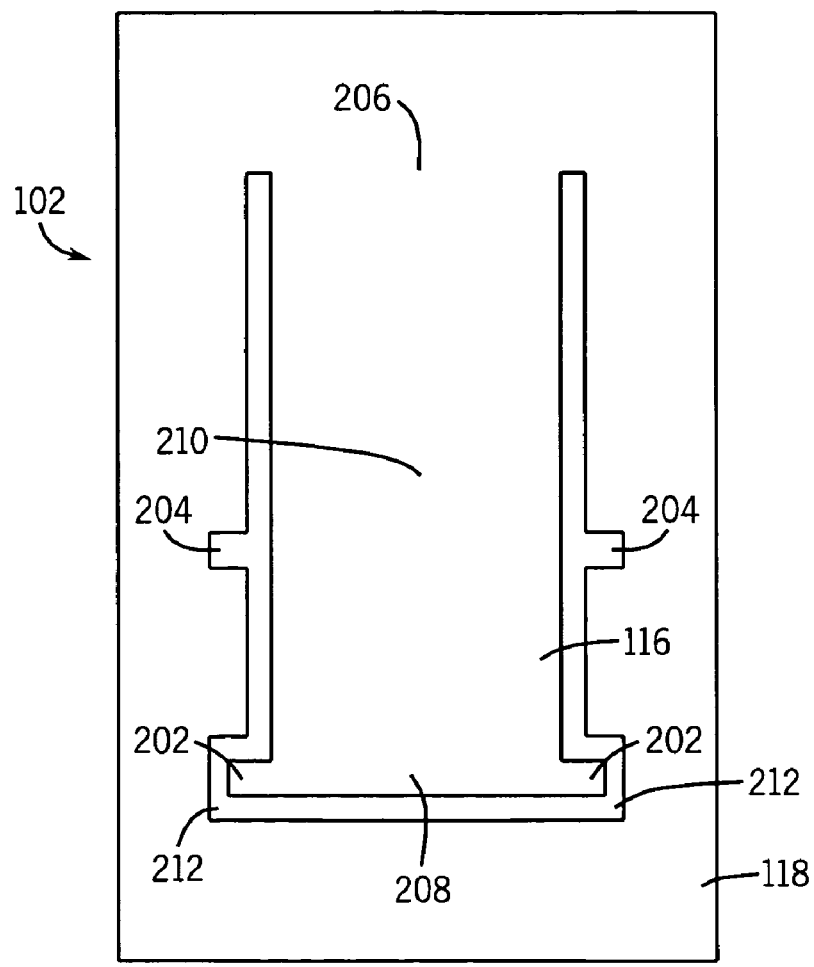
FIG. 2 is a representation of a top view of an airflow blocker component of the one or more airflow blocker components of the apparatus of FIG. 1.

Referring to FIGS. 1–2, a representation of a top view of the airflow blocker component 102 illustrates one or more holder components that maintain the flexible flap portion 208 in the bent position to impede portions of the airflow 114 from passing through the open space 112. For example, the holder components are able to capture and align the flexible flap portion 116 once the flexible flap portion 116 has been sufficiently bent. The holder components may comprise molded features, bent features, tabs, adhesives, or the like to maintain the flexible flap portion 116 in the bent position. The flexible flap portion 116 in one example comprises one or more tabs 202 and the attachment portion 118 comprises one or more slots 204. The slots 204 are sized and aligned to receive the tabs 202. An engagement between the tabs 202 and the slots 204 holds the flexible flap portion 116 in the position to impede portions of the airflow 114 from passing through the open space 112. The attachment portion 118 may comprise additional slots substantially similar to the slots 204 to hold the flexible flap portion 116 at various levels of bending. For example, if the tabs 202 engage with the additional slots, the flexible flap portion 116 will be bent to a different level than if the tabs 202 engaged with the slots 204.

The flexible flap portion 116 in one example comprises a first end portion 206, a second end portion 208, and a middle portion 210 between the first and second end portions 206 and 208. The flexible flap portion 116 is coupled with the support component 204 substantially near the first end portion 206. The flexible flap portion 116 in one example is partially cut from a layer of flexible material so that the layer of flexible material comprises the flexible flap portion 116 and the attachment portion 118. The flexible flap portion 116 comprises the tabs 202 substantially near the second end portion 208. One or more of the tabs 202 engage with one or more of the slots 204 so that the middle portion 210 of the flexible flap portion 116 extends away from the support component 204 into the open space 112 to fill a portion of the open space 112.

In one example, the flexible flap portion 116 is partially cut so that the first end portion 206 connects the flexible flap portion 116 with the attachment portion 118 and the second end portion 208 is free from connection with the attachment portion 118. For example, the second end portion 208 is able to couple with the attachment portion 118 at other locations to hold the middle portion 210 out from the attachment portion 118 in the bent position. In another example, the first end portion 206 has a fixed connection with the attachment portion 118 and the second end portion 208 is able to slide along a track on the attachment portion to bend the middle portion 210 out into the bent position.

The attachment portion 118 in one example comprises one or more notches 212 to house the tabs 202 when the flexible flap portion 116 is in the flat position. To move from the flat position to the bent position, the flexible flap portion 116 is bent back from the attachment portion 118. The tabs 202 are inserted into the slots 204 and the tabs are moved under a portion of the attachment portion 118 to be held in place between the attachment portion 118 and the support component 104 (FIG. 1).

Figure 3:
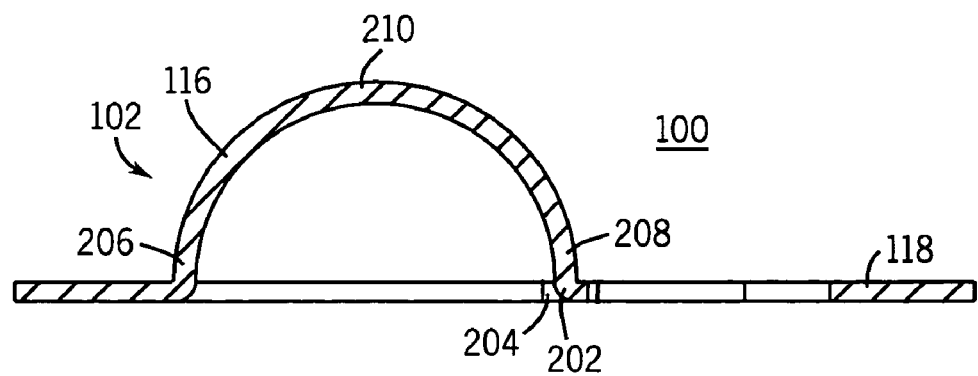
FIG. 3 is a representation of a side view of an airflow blocker component of the one or more airflow blocker components of the apparatus of FIG. 1.

Turning to FIG. 3, a representation of a side view of the airflow blocker component 102 illustrates the airflow blocker component 102 in the bent position. For example, engagement between the tab 202 and the slot 204 holds the airflow blocker component 102 in a raised arc. The middle portion 210 of the flexible flap portion 216 extends out from the attachment component 118 to create an airflow blockage.

Referring to FIG. 1, attaching the airflow blocker component 102 with the support component 104, such as the chassis lid, chassis wall, or other internal component within the chassis 106, makes the airflow blocker component 102 an integral piece of the system. Since the airflow blocker component 102 is adjustable between the bent position and the flat position while attached to the support component 104, the airflow blocker component 102 does not have to be removed from the system. Thus, the airflow blocker component 102 does not run much risk of being lost or misplaced. Also, since the airflow blocker component 102 may be formed from a single layer of flexible material, the airflow blocker component 102 is relatively inexpensive.

The apparatus 100 in one example comprises a plurality of components such as hardware components. A number of such components can be combined or divided in one example of the apparattus 100. The apparatus 100 in one example comprises any (e.g., horizontal, oblique, or vertical) orientation, with the description and figures herein illustrating one examplary orientation of the apparatus 100, for explanatory purposes.

The steps or orientations described herein are just exemplary. There may be many variations to these steps or operations without departing from the spirit of the invention. For instance, the steps may be performed in a differing order, or steps may be added, deleted, or modified.

Although exxemplary implementations of the invention have been depicted and described in detail herein, it will apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
an airflow blocker component coupled with a support component, wherein the airflow blocker component comprises a flexible flap portion that is bendable away from the support component into a position that directs one or more airflow portions to promote an increased cooling of one or more thermal components in a chassis;
wherein the flexible flap portion comprises a first end portion, a second end portion, and a middle portion between the first and second end portions;
wherein the flexible flap portion is coupled with the support component substantially near the first end portion, wherein the second end portion is selectively coupled with one or more holder components substantially near the support component;
wherein while the second end portion is coupled with the one or more holder components, the middle portion of the flexible flap portion extends away from the support component into an open space in the chassis to fill a portion of the open space.

2. The apparatus of claim 1, wherein once bent into the position away from the support component, the flexible flap portion serves to fill the portion of the open space in the chassis to direct the one or more airflow portions away from the open space.

3. The apparatus of claim 2, wherein once bent into the position away from the support component, the flexible flap portion serves to direct the one or more airflow portions towards the one or more thermal components to promote the increased cooling of the one or more thermal components.

4. The apparatus of claim 1, wherein once bent into the position away from the support component, the flexible flap portion serves to fill the portion of the open space in the chassis to impede the one or more airflow portions from flowing through the open space.

5. The apparatus of claim 1, wherein the position comprises a bent position of the flexible flap portion, wherein the one or more holder components serve to maintain the flexible flap portion in the bent position to fill the portion of the open space in the chassis.

6. The apparatus of claim 5, wherein the bent position holds the flexible flap portion in a raised arc, wherein the middle portion of the flexible flap portion is raised away from the support component, wherein the first and second end portions of the flexible flap portion are near the support component.

7. The apparatus of claim 5, wherein the flexible flap portion may be disengaged from the one or more holder components and laid in a substantially flat position against the support component to allow an additional component to fill a portion of the open space.

8. The apparatus of claim 7, wherein upon removal of the additional component from the chassis, the flexible flap portion may be bent away from the support component into the bent position to fill the portion of the open space in the chassis.

9. The apparatus of claim 5,
wherein the flexible flap portion comprises one or more tabs substantially near the second end portion.

10. The apparatus of claim 9, wherein the one or more holder components comprise one or more slots;
wherein one or more of the one or more tabs of the flexible flap portion engage with one or more of the one or more slots so that the middle portion of the flexible flap portion extends away from the support component into the open space to fill the portion of the open space.

11. The apparatus of claim 1, wherein the flexible flap portion employs a reusable adhesive that allows the flexible flap portion to attach, detach from, and reattach with the support component.

12. The apparatus of claim 1, wherein the airflow blocker component comprises the flexible flap portion and an attachment portion, wherein the attachment portion connects the flap portion to the support component.

13. The apparatus of claim 1, wherein the support component comprises a chassis lid, wherein the airflow blocker component is coupled with the chassis lid.

14. The apparatus of claim 13, wherein the airflow blocker component is positioned on the chassis lid so that the flexible flap portion is aligned with the open space within the chassis;

wherein the flexible flap portion is bent away from chassis lid into the position in the open space that directs the one or more airflow portions to promote the increased cooling of the one or more thermal components within the chassis.

15. The apparatus of claim 1, wherein the chassis comprises a computer chassis, wherein the one or more thermal components comprise one or more heat producing components adjacent to the open space in the computer chassis;

wherein the flexible flap portion is bent away from the support component into the open space to direct the one or more airflow portions towards the one or more heat producing components to promote the increased cooling of the one or more heat producing components.

16. The apparatus of claim 1, wherein the airflow blocker component comprises a layer of flexible material coupled with the support component;

wherein the flexible flap portion is partially cut from the layer of flexible material so that the layer of flexible material comprises the flexible flap portion and an attachment portion, wherein the first end portion of the flexible flap portion is connected with the attachment portion, wherein the attachment portion couples the flexible flap portion with the support component;

wherein the second end portion of the flexible flap portion is placed into a slot in the attachment portion to receive the second end portion between the attachment portion and the support component;

wherein upon engagement of the second end portion with the slot, the middle portion of the flexible flap portion is bent out from the support component to block the portion of the open space in the chassis to promote the increased cooling of the one or more thermal components within the chassis.

17. The apparatus of claim 1, wherein the one or more thermal components comprise one or more first thermal components and one or more second thermal components, wherein the one or more airflow portions comprise one or more first airflow portions and one or more second airflow portions;

wherein while the middle portion of the flexible flap portion is extended into the open space in the chassis, the flexible flap portion directs the one or more first airflow portions in a first direction towards the one or more first thermal components, wherein while the middle portion of the flexible flap portion is extended into the open space in the chassis, the flexible flap portion directs the one or more second airflow portions in a second direction towards the one or more second thermal components.

18. An apparatus, comprising:

a flexible flap that is bendable away from a support component into a position that serves to impede one or more airflow portions from passing through a space in a chassis;

one or more first holder components that serve to maintain the flexible flap in the position to impede the one or more airflow portions when the space is open; and one or more second holder components that serve to maintain the flexible flap against the support component when an additional component fills the space;

wherein the flexible flap comprises a first end portion, a second end portion, and a middle portion between the first and second end portion;

wherein the flexible flat is coupled with the support component substantially near the first end portion, wherein the second end portion is selectively coupled with the one or more first holder components substantially near the support component;

wherein while the second end portion is coupled with the one or more first holder components, the middle portion of the flexible flap extends away from the support component into the space in the chassis to fill a portion of the space.

19. The apparatus of claim 18, wherein the flexible flap comprises one or more tabs substantially near the second end portion.

20. The apparatus of claim 19, wherein the one or more first holder components comprise one or more slots;

wherein one or more of the one or more tabs of the flexible flap engage with one or more of the one or more slots so that the middle portion of the flexible flap extends away from the support component into the space to fill the portion of the space.

21. The apparatus of claim 18, wherein the support component comprises a chassis lid, wherein the flexible flap is coupled with the chassis lid;

wherein the flexible flap is positioned on the chassis lid so that the flexible flap is aligned with the space in the chassis;

wherein the flexible flap is bent away from chassis lid into the position in the open space that directs the one or more airflow portions to promote the increased cooling of the one or more thermal components.

22. The apparatus of claim 18, wherein while the middle portion of the flexible flap is extended into the space in the chassis, the flexible flap serves to direct the one or more airflow portions towards one or more thermal components to promote an increased cooling of the one or more thermal components.

23. The apparatus of claim 22, wherein the chassis comprises a computer chassis, wherein the one or more thermal components comprise one or more heat producing components adjacent to the space in the computer chassis;

wherein the flexible flap is bent away from the support component into the space to direct the one or more airflow portions towards the one or more heat producing components to promote the increased cooling of the one or more heat producing components.

24. The apparatus of claim 22, wherein the flexible flap is partially cut from a layer of flexible material so that the layer of flexible material comprises the flexible flap and an attachment portion, wherein the first end portion of the flexible flap is connected with the attachment portion, wherein the attachment portion couples the flexible flap with the support component;

wherein the second end portion of the flexible flap is placed into a slot in the attachment portion to receive the second end portion between the attachment portion and the support component;

wherein upon engagement of the second end portion with the slot, the middle portion of the flexible flap is held in the position bent out from the support component to block the portion of the space in the chassis.

25. A method, comprising the steps of:

coupling an airflow blocker component that comprises a flexible flap portion to a support component within a chassis;

bending the flexible flap portion away from the support component into a position that directs one or more airflow portions to promote an increased cooling of one or more thermal components;

wherein the flexible flap portion comprises a first end portion, a second end portion, and a middle portion between the first and second end portions, wherein the flexible flap portion is coupled with the support component substantially near the first end portion; and engaging the second end portion of the flexible flap portion with one or more holder components substantially near the support component so that the middle portion of the flexible flap portion extends away from the support component into an open space within the chassis to fill a portion of the open space.

26. The method of claim 25, wherein the step of coupling the airflow blocker component that comprises the flexible flap portion to the support component within the chassis comprises the step of:

aligning the airflow blocker on the support component so that once the flexible flap portion is bent into the position, the flexible flap component fills the portion of the open space within the chassis to impede the one or more airflow portions from passing through the open space.

27. The method of claim 25, wherein the flexible flap portion comprises one or more tabs substantially near the second end portion, wherein the one or more holder components comprise one or more slots;

wherein the step of engaging the second end portion of the flexible flap portion with the one or more holder components substantially near the support component so that the middle portion of the flexible flap portion extends away from the support component into the open space within the chassis to fill the portion of the open space comprises the step of:

engaging one or more of the one or more tabs of the flexible flap portion with one or more of the one or more slots so that the middle portion of the flexible flap portion extends away from the support component into the open space within the chassis to fill the portion of the open space.

28. The method of claim 25, wherein the chassis comprises a computer chassis, wherein the one or more thermal components comprise one or more heat producing components adjacent to the open space in the computer chassis;

wherein the step of bending the flexible flap portion away from the support component into the position that directs the one or more airflow portions to promote the increased cooling of one or more thermal components comprises the step of:

directing the one or more airflow portions away from the open space and towards the one or more heat producing components to promote the increased cooling of the one or more heat producing components.

29. The method of claim 25, wherein the step of coupling the airflow blocker component that comprises the flexible flap portion to the support component within the chassis comprises the steps of:

cutting the flexible flap portion from a layer of flexible material so that the layer of flexible material comprises the flexible flap portion and an attachment portion;

wherein the first end portion of the flexible flap portion is connected with the attachment portion, wherein the attachment portion couples the flexible flap portion with the support component; and placing the second end portion of the flexible flap portion into a slot in the attachment portion to receive the second end portion between the attachment portion and the support component;

wherein upon engagement of the second end portion with the slot, the middle portion of the flexible flap portion is held in the position bent out from the support component to block the portion of the open space in the chassis to promote the increased cooling of the one or more thermal components.

* * * * *